United States Patent [19]

Blom et al.

[11] B 3,919,470

[45] Nov. 11, 1975

[54] ASYMMETRIC APERTURE CORRECTOR FOR A TELEVISION IMAGE SIGNAL

[75] Inventors: Hendrik Blom; Prudent Eduardus Jacobus Mollet, both of Eindhoven, Netherlands

[73] Assignee: U.S. Philips Corporation, New York, N.Y.

[22] Filed: May 7, 1973

[21] Appl. No.: 357,803

[44] Published under the Trial Voluntary Protest Program on January 28, 1975 as document no. B 357,803.

[30] Foreign Application Priority Data

June 10, 1972 Netherlands .................... 7207934

[52] U.S. Cl. .......................... 178/7.1; 178/DIG. 25

[51] Int. Cl.² ...................................... H04N 5/14

[58] Field of Search .......... 178/DIG. 16, DIG. 25, 178/DIG. 34, 7.1

[56] References Cited

UNITED STATES PATENTS 3,011,018 11/1961 Sullivan .................... 178/DIG. 25

3,743,770 7/1973 Vidovic .................... 178/DIG. 25

3,783,190 1/1974 Gaebele .................... 178/DIG. 25

*Primary Examiner*—Robert L. Richardson

*Attorney, Agent, or Firm*—Frank R. Trifari; Henry I. Steckler

[57] ABSTRACT

An aperture corrector with which asymmetrical correction signals instead of the conventional symmetrical signals are generated. The correction signal part which is derived from a television image signal value located nearer the black level is relatively attenuated and that correction signal part which is derived from an image signal value located nearer the peak-white value is relatively amplified. When displaying the image signal which is aperture-corrected in an asymmetrical manner and is furthermore gamma-corrected, improved details and contours occur.

8 Claims, 5 Drawing Figures

ASYMMETRIC APERTURE CORRECTOR FOR A TELEVISION IMAGE SIGNAL

The invention relates to an aperture corrector for a television image signal, which corrector is provided with at least a delay circuit and a signal combination circuit for deriving from the image signal varying between a black level and a peak-white value an aperture correction signal having a negative and a positive going signal value relative to a reference value.

Such a corrector is described inter alia in the magazine "Journal of the SMPTE," number 11 of Nov. 1966, on pages 1080 to 1082. It has been stated that the aperture correction may be effected in the line scan direction, i.e. the horizontal direction and/or in the field scan direction, i.e. the vertical direction. In case of the combination reference is made of contour correction. When displaying an image signal which is aperture-corrected, i.e. contour-corrected, contours and details which are otherwise vague become more clearly manifest in the image. This is achieved by introducing locally a stronger darkening or brightening in case of darkbright transitions with the aid of the negative or positive going aperture correction signal; the transition is thereby emphasized.

In practice it is found that the use of aperture correction does not always and only lead to an improvement of the image quality. It is possible that with an improvement of the image quality occurring for the greater part on the image display screen a disturbingly noticeable emphasis occurs in given image sections. Especially in the case of black-white transitions this emphasis is found to become manifest in a very disturbing, exaggerated manner. A reduction of the aperture correction signal added to the image signal for the purpose of reducing the disturbing emphasis results in the image quality elsewhere on the display screen getting poorer.

An object of the invention is to realize a corrector for generating an aperture correction signal which, superimposed with the image signal, does not have the said drawbacks when displayed. To this end the corrector according to the invention is characterized in that it is provided with a signal amplifier having different amplification factors for the said positive and negative signal values in the aperture correction signal to be applied to an input, so that the corrector has an output for applying an asymmetric aperture correction signal built up of a relatively attenuated correction signal which is derived from the image signal value located nearer the black level and a relatively amplified correction signal which is derived from the image signal value located nearer the peak-white value.

Figure 1:
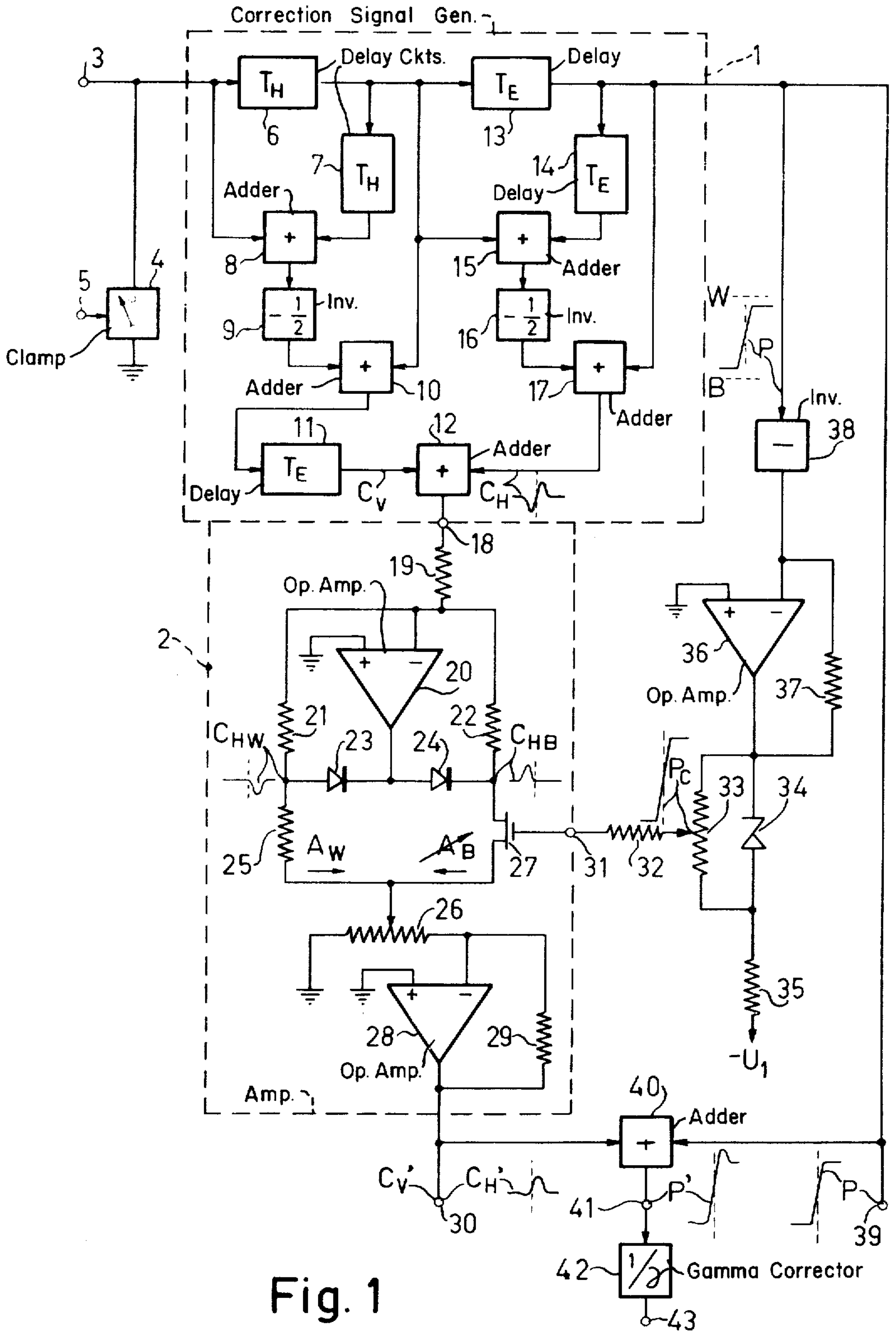
Figure 2:
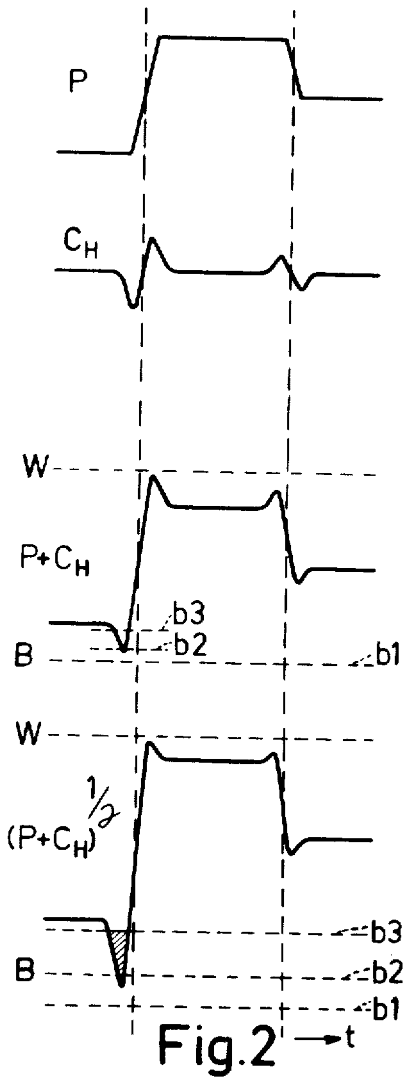
Figure 4:
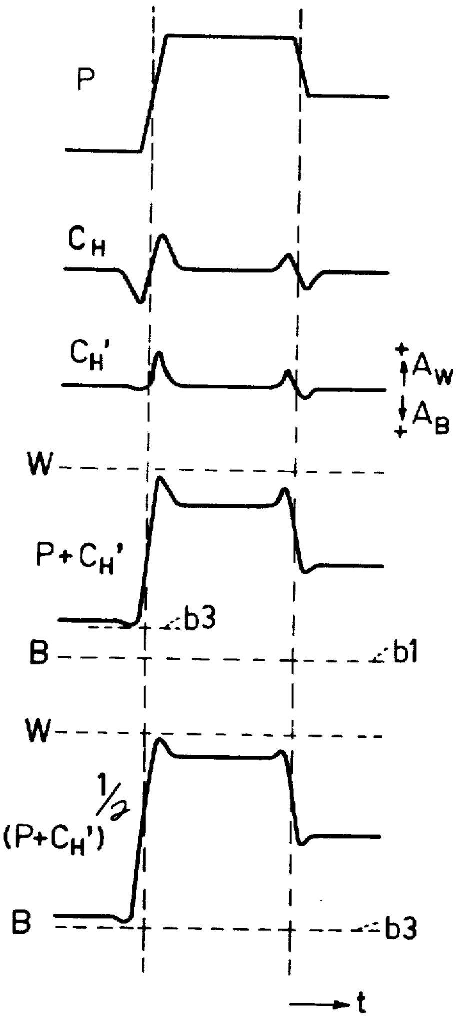
Figure 3:
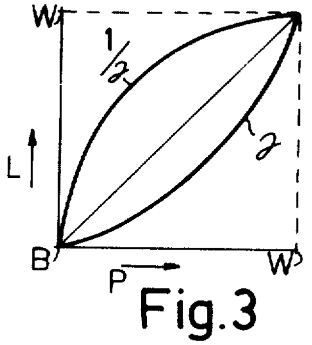
Figure 5:
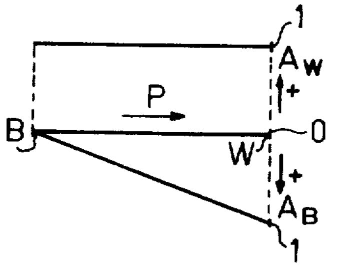

The invention will be described in greater detail with reference to the following Figures as examples in which FIG. 1 diagrammatically shows an embodiment of a corrector according to the invention, FIG. 2 serves for illustrating the signal correction for the horizontal direction performed in known manner, FIG. 3 shows a gamma curve of the brightness upon display relative to an image signal to be displayed, FIG. 4 serves to explain the aperture correction, in the horizontal direction, to be asymmetrically performed according to the invention and FIG. 5 shows two amplification factors one of which is constant and the other of which varies as a function of an image signal to be displayed.

The embodiment of the aperture corrector according to the invention shown in a block-schematic diagram in FIG. 1 includes a conventional correction signal generator 1 and a signal amplifier 2 provided according to the invention. An input of the corrector intended for the supply of a television image signal not shown is denoted by 3. The input 3 is connected to the correction signal generator 1 and is connected through a periodically active clamping circuit 4 to a reference potential shown, for example, as ground potential. The clamping circuit 4 is active as an on-off switch under the control of pulses (not shown) applied to an input 5, with which switch a so-called black level in the television image signal is fixed at ground potential before the end of a line blanking period.

The correction signal generator 1 shown in FIG. 1 generates horizontal and vertical aperture corection signals which are denoted by $C_V$ and $C_H$, respectively, and furthermore it provides an image signal P which is delayed by deriving the correction signals $C_V$ and $C_H$ therefrom. In the signal P shown in twofold a dark-bright, i.e. black-white transition is shown with which the horizontal aperture correction signal $C_H$ as shown in FIG. 1 is associated. The black level is denoted by B and the so-called peak-white value is denoted by W for one of the signals P. In the signal $C_H$ a negative and a positive going signal part are shown relative to the ground potential as a reference value introduced through the clamping circuit 4.

To derive the correction signal $C_V$, the signal generator 1 is provided with two delay circuits 6 and 7 successively connected to the input terminal 3 and each having a delay time of one line period $T_H$. The input of the delay circuit 6 and the output of the delay circuit 7 are connected to inputs of an adder stage 8. The output of the adder stage 8 which conveys the sum of the undelayed image signal and the image signal delayed over twice one line period $T_H$ is connected via a signal inverter and divide-by-two stage 9 to an input of an adder stage 10, while the output of the delay circuit 6 is connected to a further input. The output of the adder stage 10 is connected through a delay circuit 11 having a delay time of $T_E$ to an input of an adder stage 12. The delay circuit 11 provides the vertical aperture correction signal $C_V$ (delayed by the period $T_E$) in the manner described in the said Article.

For obtaining the horizontal aperture correction signal $C_H$ the correction signal generator 1 has two successively arranged delay circuits 13 and 14 each having a delay time $T_E$ which is equal to one image element period and which are connected to the output of the delay circuit 6. As has been described for the stages 8, 9 and 10 associated with the delay circuits 6 and 7, which jointly are active as a signal combination circuit, the delay circuits 13 and 14 are combined with three stages 15, 16 and 17. The adder stage 17 applies the horizontal aperture correction signal $C_H$ to an input of the adder stage 12.

The output of the adder stage 12 conveys the combined vertical and horizontal aperture correction signal ($C_V + C_H$) which is referred to as the contour correction signal. Generally the contour correction signal is added to the image signal P provided by the correction signal generator 1. Relative to the image signal applied to the input terminal 3 the image signal P is delayed by the delay time $T_H$ of, for example, one line period of 64 or 52 μs dependent on the television standard and by the delay time $T_E$ which may be defined as an image element period at approximately 150 to 100 ns. In order to be able to combine the vertical aperture correction signal $C_V$ with the delayed image signal P, the delay circuit 11 is provided which compensates for the delay time of the circuit 13.

The said Article states that it is favourable in a colour television camera generating three image signals (chrominance signals red, green and blue) to derive a contour correction signal only from the green chrominance signal and to add this to all three chrominance signals.

Furthermore it has been proposed to form the correction signal generator 1 with a single storage tube as a delay circuit having a delay time of one field period. In that case the image signal is applied to a cathode of an electron gun and the contour correction signal is derived from a target on which the electron beam writes a television raster. The storage tube then operates as a delay signal combination circuit. The specific embodiment of the correction signal generator 1 is irrelevant for the invention.

To illustrate the normally performed aperture correction FIG. 2 shows some signals as a function of time *t*. FIG. 2 applies to an aperture correction in the horizontal direction. The image signal P is shown with two edges for which in case of display the first occurring lead edge corresponds to, for example, a dark grey-white transition and the next short edge corresponds to a white-light grey transition. In the manner described with reference to FIG. 1 a horizontal aperture correction signal $C_H$ as shown in FIG. 2 is generated. The addition of the correction signal $C_H$ to the image signal P yields an aperture-corrected image signal $P + C_H$. The vague transitions are rendered sharper and are emphasized by means of the correction signal $C_H$. A black level B and a peak-white level W are shown at the signal $P + C_H$. The black level B may occur, for example, with one of three values $b1$, $b2$ or $b3$. It is found that the signal $P + C_H$ varies between the black level $B = b1$ and the peak-white value W. As is common practice in case of exceeding the black level ($B = b2$ or $b3$), the exceeding signal part of the signal $P + C_H$ might be removed by limiter circuits following the aperture corrector according to FIG. 1. In fact, a value which is lower than the black level B is not allowed. Exceeding the peak-white value W is generally admitted when it is small and occurs incidentally.

A display of the signal $P + C_H$ of FIG. 2, without further signal processing would not present any difficulties in case of a black level $B = b1$ or $b2$ if the brightness on the display screen of a display tube occurs in accordance with the same function. In this case it has been assumed that when using a pick-up tube having a linear pick-up characteristic for the image signal P the display tube likewise has a linear display characteristic between brightness and image signal. As is known this is, however, not the case because the brightness in a display tube occurs in accordance with an exponential function of the applied image signal.

FIG. 3 shows a normalised gamma curve $\gamma$ according to which the brightness denoted by L depends on the applied image signal P in the case of display. In order to realize that the brightness L occurs in accordance with the desired linear function upon display, the image signal P is firstly subjected to a gamma correction: the image signal P is amplified in accordance with a curve $1/\gamma$ shown in FIG. 3. The amplification factor for the signal P is, for example, 3 to 6 near the black level B, while the factor near the peak-white value W may be approximately 0.5. FIG. 2 shows with $(P + C_H)^{1/\gamma}$ a possible result of an image signal P firstly aperture-corrected and then gamma-corrected.

In the signal $(P + C_H)^{1/\gamma}$ the three possible black levels B are denoted by $b1$, $b2$ and $b3$. Without accounting for the exact value of the black level B it has been assumed for the correction signal $C_H$ added to the image signal P that the amplification factor near the black level B is approximately two, near peak-white value W it is approximately one half and is approximately one therebetween.

When processing the signal $(P + C_H)^{1/\gamma}$ to be applied to a display tube the following applies for the display on the display screen.

With the black level $B = b1$ being present, the brightness on the display screen occurs in accordance with the same function as the signal $P + C_H$. This is the case as desired; the performed gamma correction satisfies the imposed requirement.

In the presence of the black level $B = b2$ or $B = b3$ it is found that the black level is clearly exceeded. The signal which is subsequently available for application to the display tube does not have the signal parts removed through limiter circuits and shown in a shaded area in FIG. 2.

A comparison of the signals $P + C_H$ and $(P + C_H)^{1/\gamma}$ in the presence of the black level $B = b2$ shows that the emphasis of the transition caused by the gamma correction and extending as far as the black area results in a broadening of the contour upon display. In practice such a broadening in the black area becomes disturbingly manifest upon display.

In the presence of the black level $B = b3$ it is also found without gamma correction that the black level in the signal $P + C_H$ is exceeded so that a disturbingly broadened emphasis occurs in the black area. The performed gamma correction results in a further broadening.

To prevent the described disturbing emphasis which becomes manifest in an intensified manner due to gamma correction, the signal amplifier 2 is used according to the invention in the aperture corrector of FIG. 1.

The signal amplifier 2 is provided with an input 18 which for the application of the contour correction signal $C_V + C_H$ is connected to the output of the adder stage 12. For the sake of simplicity of the description of the signal path in the signal amplifier 2 it will be particularly described for the horizontal aperture correction signal $C_H$; the signal $C_V$ undergoes the same treatment. The input 18 is connected through a resistor 19 to an inverting (−) input of an operational amplifier 20, a non-inverting (+) input of which is connected to ground. The inverting input of the amplifier 20 is furthermore connected via two series arrangements of resistors 21 and 22 and diodes 23 and 24, respectively, having opposite pass directions to the output thereof. The junction of the resistor 21 and the anode of the diode 23 is connected through a resistor 25 to a tap on a potentiometer 26. The junction of the resistor 22 and the cathode of the diode 24 is connected to the source electrode of a transistor 27 of the type having an insulated gate electrode, while the drain electrode is connected to a tap on the potentiometer 26. The potentiometer 26 is provided between ground and an inverting input of an operational amplifier 28 whose non-inverting input is connected to ground. A feedback resistor 29 is provided between the output of the amplifier 28 and the inverting input while the output is furthermore connected to an output 30 of the aperture corrector.

The gate electrode of the transistor 27 is connected to a control input 31 of the signal amplifier 2 which is connected through a resistor 32 to a tap on a potentiometer 33 arranged in parallel with a Zener diode 34. One connection of the parallel arrangement (33, 34) is connected through a resistor 35 to a supply terminal conveying a voltage $-U_1$, whilst the other connection is connected to the output of an operational amplifier 36. The non-inverting input of the amplifier 36 is connected to ground and the inverting input is connected through a feedback resistor 37 to the output and is furthermore connected through an inverter stage 38 to the output of the delay circuit 13 which is also connected to the output 39 of the aperture corrector conveying the image signal P. The outputs 30 and 39 are connected to inputs of an adder stage 40 having an output 41 which is connected to a gamma corrector 42 having an output 43.

In accordance with its described structure the signal amplifier 2 has two signal channels, namely one is which the operational amplifier 20 is active in combination with the diode 23 and the feedback resistor 21, which channel furthermore comprises the resistor 25, and the other channel in which the operational amplifier 20 is active in combination with the diode 24 and the feedback resistor 22 and which furthermore comprises the transistor 27. Together with the diodes 23 and 24 and the resistors 21 and 22 the operational amplifier 20 constitutes a signal splitter circuit (20–24) because for a negative output signal of the amplifier 20 the diode 23 is rendered conducting and for a positive output signal the diode 24 is rendered conducting. Due to the application of the signal to the inverting input of the amplifier 20 a positive or negative going signal part of the contour correction signal $C_V + C_H$ corresponds thereto. FIG. 1 shows for the horizontal aperture correction signal $C_H$ how the signal splitting is effected while a signal part $C_{HB}$ occurs at the junction of the diode 24 and the resistor 22 and a signal part $C_{HW}$ occurs at the junction of the diode 23 and the resistor 21. A comparison of the signal parts $C_{HB}$ and $C_{HW}$ with the correction signal $C_H$ and the image signal P shows that the signal part $C_{HB}$ is derived from the image signal value located nearer the black level B and that the signal part $C_{HW}$ is derived from the image signal value located nearer the peak-white value W.

The embodiment of the signal amplifier 2 using two signal channels (20, 21, 23, 25) and (20, 22, 24, 27) provides a simple possibility to amplify or attenuate the signal parts $C_{HW}$ and $C_{HB}$ differently. For the resistors 21 and 22 having the same value this can be achieved by rendering the value of the resistor 25 different from the resistance of the source-drain path of the transistor 27. Instead of transistor 27 it is alternatively possible to use a resistor which might be either adjustable or not. Due to the given transistor embodiment having a gate electrode connected to the control input 31 a simple adjustment of the resistance would be obtained if an adjustable direct voltage were applied thereto. Application of a control voltage then results in a varying resistance. In order to be able to control the amplification in the signal channel (20, 22, 24, 27) as a function of the instantaneous value of the image signal P, a control signal $P_C$ is derived therefrom which is applied to the control input 31. The controllable resistance of the transistor 27 is large for low values in the control signal $P_C$ (near the black level B in the signal P) and small for high values (near the peak-white value W in the signal P). The result is that in case of a constant amplification factor denoted by $A_W$ in the signal channel (20, 21, 23, 25) a varying amplification factor denoted by $A_B$ occurs in the signal channel (20, 22, 24, 27).

Together with the feedback resistor 29, the resistor 25 and the transistor 27 the operational amplifier 28 constitutes a signal adder circuit in which furthermore the potentiometer 26 occurs for adjusting the peak-to-peak value of the output signal from the amplifier 28. The output signal from the signal adder circuit (25–29) becomes available at the output 30 as a modified contour correction signal $C_V' + C_H'$. A comparison of the signal $C_H$ applied to the input 18 of the signal amplifier 2 and the signal $C_H'$ supplied at the output 30 shows than an asymmetrical aperture correction signal is obtained. The output 41 conveys an asymmetrical aperture-corrected image signal $P' = P + (C_V' + C_H')$. The advantage of the asymmetric aperture correction is apparent from the signals shown in FIG. 4.

In FIG. 4 likewise as in FIG. 2 the image signal P and the horizontal aperture correction signal $C_H$ are plotted as a function of time $t$. The asymmetric aperture correction signal $C_H'$ is formed with the aid of the signal amplifier 2 shown in FIG. 1 from the symmetric aperture correction signal $C_H$. FIG. 5 shows as a function of the value of the image signal P the possibly occurring amplification factors $A_W$ and $A_B$ between the black level B and the peak-white value W. In the given embodiment it has been assumed that $A_W = 1$ and $A_B = 0$ for P = B and $A_B = 1$ for P = W with a linear variation therebetween. For the signals $C_H'$ and $C_H$ in FIG. 4 there follows, for example, that with the same positive signal peaks ($A_W = 1$) in which the first is twice as large as the other, the first negative signal peak has decreased by a factor of 12 ($A_B = 1/12$) while the other has been reduced to half the value ($A_B = 1/2$).

The addition of the asymmetric aperture correction signal $C_H'$ to the image signal P yields the aperture-corrected signal $P + C_H'$ shown in FIG. 4. After subsequent gamma correction the result is the shown signal $(P + C_H')^{1/\gamma}$ . A comparison of the signal $(P + C_H')^{1/\gamma}$ of FIG. 4 with the signal $(P + C_H)^{1/\gamma}$ of FIG. 2 clearly shows the desired result; the gamma correction does not cause any exceeding of even the black level $B = b3$ so that there is no disturbing broadening and emphasis of the contour. The signal $P + C_H'$ of FIG. 4 and the signal $P + C_H$ of FIG. 2 also show that, while leaving the gamma correction out of consideration, the use of the black level $B = b3$ has been made possible without the introduction of the disturbing broadening.

The fact that the asymmetrical aperture correction performed according to the invention with the advantages emanating therefrom can be used for obtaining an image satisfactorily corrected in detail and contours is based on the recognition that the observer's eye is more sensitive to contrast differences in darker rather than in brighter regions. As a result the value of the aperture correction signal in the dark image area may be smaller than in the bright image area in case of more or less the same impression on the eye.

Instead of the characteristic of the variable amplification factor $A_B$ which varies linearly in FIG. 5 it may alternatively not vary linearly. It is alternatively possible to perform a discontinuous control in two or more stages in which a different, constant amplification factor is associated with each stage, which stages occur as a function of the instantaneous value of the image signal.

The embodiment of the adjustable resistance in the signal channel (20, 22, 24, 27) shown in FIG. 1 with the described transistor 27 being formed as a field effect transistor is found to be quite satisfactory in practice. A desired characteristic of the controlled amplification factor $A_B$ may be obtained in a simple manner by displacing the wiper on the potentiometer 33 and the resultant displacement of the adjusting point of the transistor 27 with the difference between black level and peak-white value remaining the same. In fact, the operational amplifier 36 amplifies the image signal P inverted therefor to the control signal $P_C$ having a black-white range which is suitable for controlling the transistor 27, while in the control signal $P_C$ a desired direct voltage level can be adjusted by deriving part of the constant direct voltage occurring across the Zener diode 34 through the potentiometer 33.

What is claimed is:

1. An aperture corrector for a television image signal, which corrector is provided with at least a delay circuit and a signal combination circuit for deriving from the image signal varying between a black level and a peak-white value an aperture correction signal having a negative and a positive going signal value relative to a reference value, characterized in that the corrector is provided with a signal amplifier having different amplification factors for the said positive and negative signal values in the aperture correction signal to be applied to an input, so that the corrector has an output for applying an asymmetric aperture correction signal built up of a relatively attenuated correction signal which is derived from the image signal value located nearer the black level and a relatively amplified correction signal which is derived from the image signal value located nearer the peak-white value.

2. An aperture corrector as claimed in claim 1, characterized in that of the two said different amplification factors one is variable while for controlling the variable amplification factor the signal amplifier is provided with a control input for applying the instantaneous image signal.

3. An aperture corrector as claimed in claim 1, characterized in that the signal amplifier is formed with two signal channels which are connected to the input of the signal amplifier through a signal splitter circuit for splitting the aperture correction signal into the said positive and negative signals, the signal channels having the different amplification factors being connected through a signal adder circuit to the output of the corrector.

4. An aperture corrector as claimed in claim 3, characterized in that the signal splitter circuit is formed with an operational amplifier an input of which is connected to the said input of the signal amplifier, the input of said operational amplifier being connected to the output thereof through two series arrangements each including a resistor and a diode having opposite pass directions, the junctions of diodes and resistors in one signal channel being coupled to the signal adder circuit through a constant resistance and in the other signal channel being coupled to the signal adder circuit through a variable resistance.

5. An aperture corrector as claimed in claim 4, characterized in that of the two said different amplification factors one is variable while for controlling the variable amplification factor the signal amplifier is provided with a control input for applying the instantaneous image signal and the said variable resistance is formed as a transistor having an isolated gate electrode which is connected to the said control input of the signal amplifier, while a source electrode is connected to the diode-resistor junction and a drain electrode is incorporated in the signal adder circuit.

6. An aperture corrector as claimed in claim 5, characterized in that the control input is connected to a wiper on a potentiometer which is incorporated in a parallel arrangement with a Zener diode, one connection of the parallel arrangement being connected through a resistor to a supply terminal while the image signal is applied to the other connection.

7. An aperture corrector as claimed in claim 6, characterized in that the said other connection of the parallel arrangement of the Zener diode and the potentiometer is connected to an output of an operational amplifier while the image signal is applied to an input thereof.

8. A method for aperture correcting a television signal varying between black and white levels, said method comprising deriving from said signal a symmetric aperture correction signal having positive and negative going component signals, reducing black area extension by deriving from said symmetric aperture correction signal an asymmetric aperture correction signal having a large correction signal near said white level and a relatively small correction signal near said black level, and applying said asymmetric correction signal to said television signal.

* * * * *